United States Patent
Pascu et al.

(10) Patent No.: US 9,845,806 B2
(45) Date of Patent: Dec. 19, 2017

(54) ENGINE SPEED OPTIMIZATION AS A METHOD TO REDUCE APU FUEL CONSUMPTION

(71) Applicant: United Technologies Corporation, Hartford, CT (US)

(72) Inventors: Victor Pascu, San Diego, CA (US); Anthony C. Jones, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 12 days.

(21) Appl. No.: 14/731,047

(22) Filed: Jun. 4, 2015

(65) Prior Publication Data

US 2016/0356280 A1  Dec. 8, 2016

(51) Int. Cl.
 F04D 27/00 (2006.01)
 F04D 17/10 (2006.01)
 F02C 9/16 (2006.01)
 F02C 9/28 (2006.01)

(52) U.S. Cl.
 CPC .............. *F04D 27/004* (2013.01); *F02C 9/16* (2013.01); *F02C 9/28* (2013.01); *F04D 17/10* (2013.01); *F05D 2220/50* (2013.01); *F05D 2270/03* (2013.01); *F05D 2270/061* (2013.01); *F05D 2270/07* (2013.01); *F05D 2270/112* (2013.01); *F05D 2270/20* (2013.01); *F05D 2270/303* (2013.01); *F05D 2270/304* (2013.01); *F05D 2270/313* (2013.01)

(58) Field of Classification Search
 CPC .......... F04D 27/004; F04D 17/10; F02C 9/28; F02C 9/16; F05D 2270/112; F05D 2220/50; F05D 2270/304; F05D 2270/03; F05D 2270/07; F05D 2270/303; F05D 2270/313; F05D 2270/20; F05D 2270/061
 See application file for complete search history.

(56) References Cited

U.S. PATENT DOCUMENTS

| | | | | |
|---|---|---|---|---|
| 5,289,106 A | * | 2/1994 | McGinn | F21S 9/046 307/84 |
| 5,576,963 A | * | 11/1996 | Ribbens | G01M 15/11 123/436 |
| 6,278,262 B1 | * | 8/2001 | Ullyott | B64D 41/00 307/84 |
| 6,362,590 B2 | * | 3/2002 | Nozari | 318/609 |
| 6,794,766 B2 | * | 9/2004 | Wickert | F01D 15/10 290/52 |

(Continued)

FOREIGN PATENT DOCUMENTS

| | | | |
|---|---|---|---|
| JP | 06189552 A | * | 7/1994 |
| JP | 2006210176 A | * | 8/2006 |
| KR | 20130335419 A | * | 12/2013 |

OTHER PUBLICATIONS

Extended European Search Report dated Oct. 17, 2016 in European Application No. 16173076.7.

*Primary Examiner* — Tuan C. To
(74) *Attorney, Agent, or Firm* — Snell & Wilmer L.L.P.

(57) ABSTRACT

Systems and methods for controlling an auxiliary power unit (APU) are provided. The systems and methods may comprise detecting an operating condition of the APU, determining an optimal APU frequency in response to the operating condition, and setting an angular velocity of the APU to the optimal APU frequency.

17 Claims, 3 Drawing Sheets

(56) References Cited

U.S. PATENT DOCUMENTS

| | | | |
|---|---|---|---|
| 7,367,193 B1 | 5/2008 | Thompson | |
| 9,450,527 B2* | 9/2016 | Anghel | H02P 9/00 |
| 2003/0080244 A1* | 5/2003 | Dionne | B64D 33/08 |
| | | | 244/57 |
| 2004/0195441 A1* | 10/2004 | Wingett | B64C 13/50 |
| | | | 244/99.5 |
| 2006/0012180 A1* | 1/2006 | Hoppe | F02C 7/268 |
| | | | 290/38 R |
| 2007/0221431 A1* | 9/2007 | Hirsh | B60K 5/10 |
| | | | 180/299 |
| 2008/0179947 A1 | 7/2008 | Suttie | |
| 2010/0017013 A1* | 1/2010 | Terashima | B66D 3/18 |
| | | | 700/213 |
| 2010/0024434 A1* | 2/2010 | Moore | F02C 7/32 |
| | | | 60/788 |
| 2010/0271199 A1* | 10/2010 | Belov | G01M 5/00 |
| | | | 340/539.3 |
| 2011/0101778 A1* | 5/2011 | Yang | H02J 7/0068 |
| | | | 307/52 |
| 2012/0117974 A1 | 5/2012 | Hilgeman et al. | |
| 2012/0138737 A1* | 6/2012 | Bruno | B64D 41/00 |
| | | | 244/58 |
| 2013/0204544 A1* | 8/2013 | Thomas | G01P 21/025 |
| | | | 702/41 |
| 2013/0227959 A1* | 9/2013 | Ainslie | F02C 7/26 |
| | | | 60/778 |
| 2015/0279218 A1* | 10/2015 | Irrgang | G08G 5/0039 |
| | | | 701/3 |
| 2016/0284195 A1* | 9/2016 | Priest | G08B 21/182 |

* cited by examiner

ENGINE SPEED OPTIMIZATION AS A METHOD TO REDUCE APU FUEL CONSUMPTION

FIELD OF INVENTION

The present disclosure relates to an auxiliary power unit (APU), and, more specifically, to a system and method of using speed optimization as a method to reduce APU mission fuel burn.

BACKGROUND

An auxiliary power unit (APU) on an aircraft may be a gas turbine engine engaged to produce electrical and pneumatic power. The power demand loading the APU may be variable during APU operation. Typically, in order to maintain constant generator frequency the APUs operate at constant speed. The operating speed is chosen such as to optimize the engine performance at maximum loading conditions and compromising the performance at partial load conditions. In modern applications, this restriction is removed and the APU can produce electrical power with variable frequency. However, APUs operating at variable frequencies may result in suboptimal engine performance at some power conditions.

SUMMARY

A method for controlling an auxiliary power unit (APU) may comprise the steps of detecting an operating condition of the APU, determining an optimal APU frequency in response to the operating condition, and setting an angular velocity of the APU to the optimal APU frequency.

In various embodiments, the operating condition may comprise an exhaust gas temperature (EGT). The setting the angular velocity of the APU may occur in response to an EGT crossing a threshold value. The operating condition may comprise at least one of an ambient temperature, an altitude, or an air speed. A pneumatic demand on the APU may be determined. The determining the optimal APU frequency may further comprise retrieving the optimal APU frequency from a lookup table. An electric demand on the APU may be determined.

An auxiliary power unit (APU) control system may comprise a non-transitory memory communicating with a controller, the non-transitory memory having instructions stored thereon that, in response to execution by the controller, cause the controller to perform operations. The operations may include detecting an operating condition of the APU, determining an optimal APU frequency in response to the operating condition, and setting an angular velocity of the APU to the optimal APU frequency.

In various embodiments, the operating condition may comprise an exhaust gas temperature (EGT). The setting the angular velocity of the APU may occur in response to an EGT crossing a threshold value. The operating condition may comprise at least one of an ambient temperature, an altitude, or an air speed. A pneumatic demand and/or an electric demand on the APU may be determined. Determining the optimal APU frequency may further comprise retrieving the optimal APU frequency from a lookup table.

An article of manufacture may include a non-transitory, tangible computer readable storage medium having instructions stored thereon that, in response to execution by a controller configured for controlling an auxiliary power unit (APU), cause the controller to perform operations. The operations may include detecting an operating condition of the APU, determining an optimal APU frequency in response to the operating condition, and setting an angular velocity of the APU to the optimal APU frequency.

In various embodiments, the operating condition may comprise an exhaust gas temperature (EGT). Setting the angular velocity of the APU may occur in response to an EGT crossing a threshold value. The operating condition may comprise at least one of an ambient temperature, an altitude, or an air speed. A pneumatic and/or electric demand on the APU may be determined Determining the optimal APU frequency further comprises retrieving the optimal APU frequency from a lookup table.

The foregoing features and elements may be combined in various combinations without exclusivity, unless expressly indicated otherwise. These features and elements as well as the operation thereof will become more apparent in light of the following and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The option for variable frequency generator in modern aircraft architectures opens the opportunity to use APU frequency as a parameter for engine performance optimization. The systems and methods disclosed herein are best executed at part load conditions, which actually represent the majority of the engine real field operation, having as target the engine mission fuel flow reduction. Instead of operating at constant frequency, based on engine load requirements, the engine frequency (i.e., angular velocity) can be changed to operate as close as possible to maximum thermal efficiency conditions. The operating frequency may be devised based on an optimization study to reduce fuel consumption while meeting all performance requirement in terms of deliverables, operability and operating life. The increase of thermal efficiency may imply an increase of engine TIT (turbine inlet temperature), which may have an impact on engine life. An increased TIT may be mitigated by the frequency change applied at part load condition, where the TIT is low and the engine can withhold a temperature increase without affecting the engine life. As a result, mission fuel flow may be reduced by up to 10% with limited impact on engine life, if any.

Figure 1:
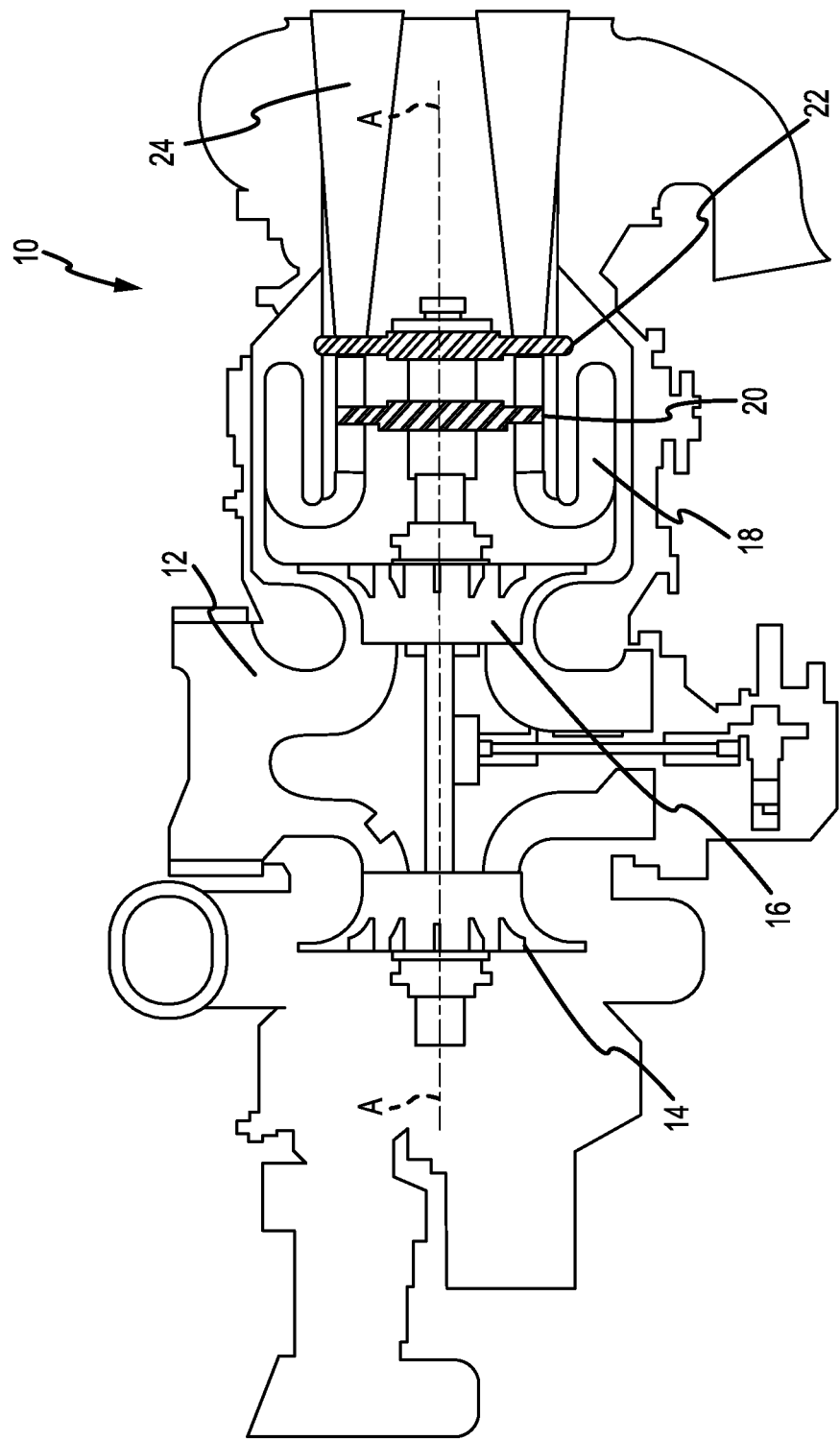
FIG. 1 illustrates an exemplary APU, in accordance with various embodiments.

With reference to FIG. 1, an exemplary APU is shown, in accordance with various embodiments. APU 10 may include a centrifugal compressor 16 for pressurizing incoming air from inlet 12. A combustor 18 may be disposed aft of centrifugal compressor 16 (also referred to herein as an impeller). The compressed air may be mixed with fuel and ignited in the combustor 18, generating an annular stream of hot combustion gases moving towards exhaust duct 24. A turbine 20 and turbine 22 may be aft of the combustor 18 and is also mechanically coupled to centrifugal compressor 16 through a shaft. Turbine 20 and turbine 22 may extract energy from the combusted gases exiting the combustor 18. In various embodiments, one or more of the previous components may not be present.

Various components of APU 10 may rotate about an axis of rotation A. The centrifugal compressor 16 may direct compressed air towards the combustor 18. The forward and aft positions of APU 10 may be described relatively along axis of rotation A. For example, load compressor 14 may be referred to as forward of turbine 20 and turbine 20 may be referred to as aft of load compressor 14. As air flows from centrifugal compressor 16 to the more aft components of APU 10, axis of rotation A may also generally define the net direction of the air stream flow. However, the direction of the air stream flow may vary through the individual components. For example, the air flow may be radial in portion of centrifugal compressor 16.

Figure 2:
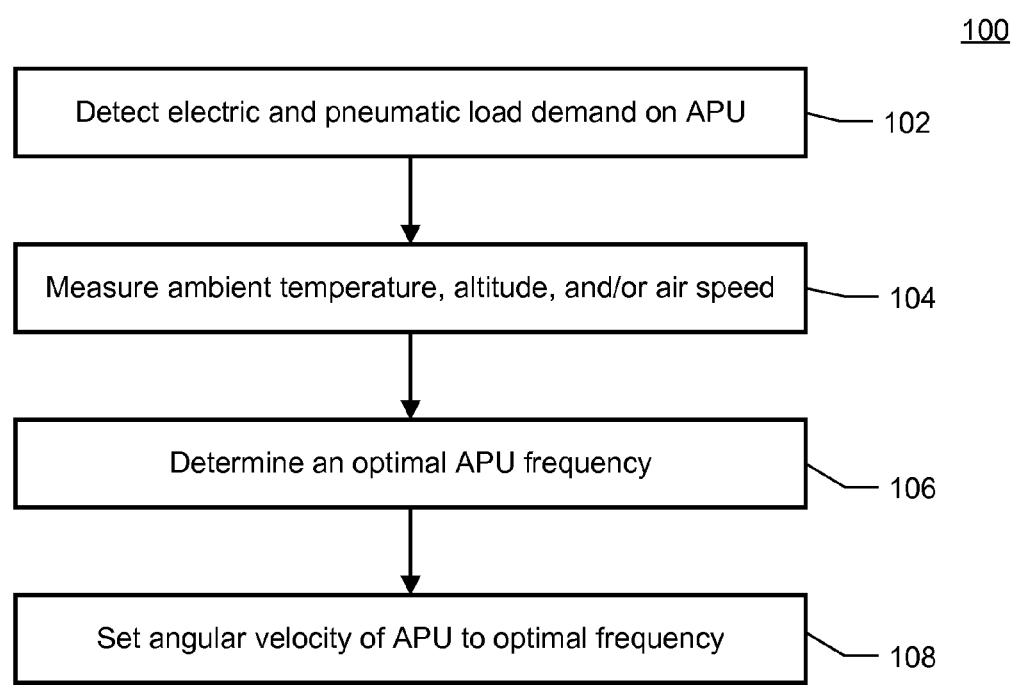
FIG. 2 illustrates a method of controlling APU frequency in response to ambient conditions and load demand, in accordance with various embodiments.

With reference to FIGS. 1 and 2, a load demand based method 100 of controlling an APU 10 is shown, in accordance with various embodiments. APU 10 may comprise a variable frequency APU or a constant frequency APU. A constant frequency APU may operate within a design range (e.g., within 5% or within 1%) of a target operating frequency, for example, and may also have the operating frequency reduced by a small percentage of operating frequency (e.g., smaller than the design range), as discussed in further detail below. A variable frequency APU may generate operate at frequencies that may vary to meet output demands Variable frequency APUs may have the operating frequency adjusted over a range of frequencies and thus be controlled more flexibly.

In various embodiments, a controller may comprise a full authority digital engine control (FADEC) system, the FADEC may comprise an electronic control box (ECB). A FADEC may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

In various embodiments, the FADEC may take measurements of ambient conditions and load demands then set engine angular velocity (i.e., the impellor frequency) accordingly to optimally balance engine efficiency and APU wear. The FADEC may detect the electrical and/or pneumatic load demand on APU 10 (Block 102). The electrical load demand may be measured in terms of electrical demand for supported systems. The pneumatic demand may be bleed pressure load required by the pneumatic systems supported by the APU.

In various embodiments, the FADEC may measure, or receive, ambient temperature, altitude, and/or air speed readings (Block 104). Other operating conditions may further be measured or received such as exhaust gas temperature (EGT), operational hours, or other suitable operating conditions. The operating conditions may be used to determine an optimal operating frequency. For example, the FADEC may determine an optimal APU angular velocity using, for example, a lookup table based at least partially on the measured operating conditions. The FADEC may use an algorithm to determine a proper value corresponding to the measured operating conditions.

In various embodiments, the FADEC may then determine an optimal APU frequency (Block 106). The optimal APU frequency may be determined by matching the detected electric and/or pneumatic load demands on the APU to the most efficient engine frequency that will meet the load demands. In an embodiment, the optimal APU frequency may further be determined by balancing engine life (i.e., exhaust temperature) against angular velocity of APU 10 to generate output meeting load demands (i.e., electric and/or pneumatic demands). Lower angular velocity may correlate with greater efficiency (i.e., energy output per fuel consumption) as well as higher exhaust temperatures. As previously stated, higher exhaust temperatures may result in shortened APU service life. Once the optimal APU frequency is determined, the FADEC may set the angular velocity of APU 10 to the optimal APU frequency (Block 108). The angular velocity may be controlled by reducing or increasing fuel provided to the APU for ignition.

For example, while at very high load and high day temperature conditions the engine may operate at a frequency which may result in minimum turbine inlet temperature. At part load and/or in cold conditions the engine frequency may be set such as to obtain the maximum fuel flow reduction that will meet the load demands with an acceptable increase of engine temperature. The temperature increase impact over engine life may be assessed based on the duty cycle. By adjusting APU operating angular velocity to optimal frequencies, fuel flow can be reduced by 5% to 10% from a peak fuel flow while meeting power demand.

Figure 3:
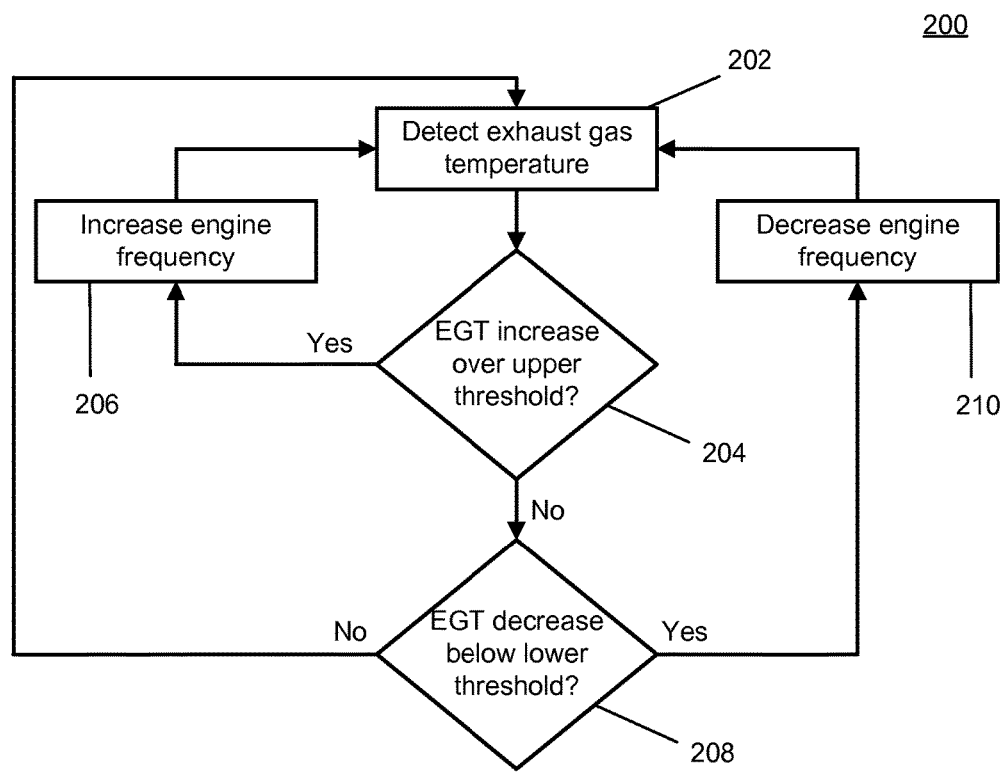
FIG. 3 illustrates a method of controlling APU frequency based on an exhaust gas temperature, in accordance with various embodiments.

With reference to FIGS. 1 and 3, an EGT based method of controlling an APU 10 frequency is shown, in accordance with various embodiments. Exhaust gas temperature may be indicative of APU 10 operating temperatures. The temperature may be measured using a thermal measurement device such as a thermocoupling that generates an electronic signal read by the FADEC. The thermal measurement device may be located in or near exhaust duct 24 of APU 10. The EGT may increase or decrease in response to electric or pneumatic load on APU 10 increasing or decreasing, respectively. APU 10 operating at elevated operating temperatures (i.e., above intended operating temperatures) may have a shortened service life relative to an APU 10 that does not operate at elevated temperatures. As APU angular velocity is reduced below the intended operating frequency, the APU exhaust temperature may increase.

The FADEC may detect an EGT (Block 202). The FADEC may then determine whether the EGT increased from a previous value over an upper threshold (Block 204). An upper threshold may be a predetermined temperature selected to trigger an engine frequency increase. The FADEC may then increase engine frequency (Block 206) in response to detecting an EGT above the upper threshold temperature. The FADEC may then continue monitoring the EGT in response to increasing the engine frequency.

In various embodiments, the FADEC may determine whether the EGT has decreased below a lower threshold (Block 208). The FADEC may then decrease engine frequency (Block 210) in response to detecting an EGT below the lower threshold. The FADEC may then continue monitoring the EGT in response to increasing the engine frequency.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling an auxiliary power unit (APU), comprising:
    determining a load on the APU, wherein the load comprises at least one of an electrical load or a pneumatic load;
    detecting an operating condition of the APU;
    determining an optimal APU frequency in response to the operating condition and the load; and
    setting an angular velocity of the APU to the optimal APU frequency.

2. The method of claim 1, wherein the operating condition comprises an exhaust gas temperature (EGT).

3. The method of claim 2, wherein the setting the angular velocity of the APU occurs in response to an EGT crossing a threshold value.

4. The method of claim 1, wherein the operating condition comprises at least one of an ambient temperature, an altitude, or an air speed.

5. The method of claim 1, wherein the determining the optimal APU frequency further comprises retrieving the optimal APU frequency from a lookup table.

6. The method of claim 1, further comprising determining an electric demand on the APU.

7. An auxiliary power unit (APU) control system, comprising:
    a non-transitory memory communicating with a controller, the non-transitory memory having instructions stored thereon that, in response to execution by the controller, cause the controller to perform operations comprising:
    determining a load on the APU, wherein the load comprises at least one of an electrical load or a pneumatic load;
    detecting an operating condition of the APU;
    determining an optimal APU frequency in response to the operating condition and the load; and
    setting an angular velocity of the APU to the optimal APU frequency.

8. The method of claim 7, wherein the operating condition comprises an exhaust gas temperature (EGT).

9. The method of claim 8, wherein the setting the angular velocity of the APU occurs in response to an EGT crossing a threshold value.

10. The method of claim 7, wherein the operating condition comprises at least one of an ambient temperature, an altitude, or an air speed.

11. The method of claim 10, wherein the determining the optimal APU frequency further comprises retrieving the optimal APU frequency from a lookup table.

12. The method of claim 7, further comprising determining an electric demand on the APU.

13. An article of manufacture including a non-transitory, tangible computer readable storage medium having instructions stored thereon that, in response to execution by a controller configured for controlling an auxiliary power unit (APU), cause the controller to perform operations comprising:
    determining a load on the APU, wherein the load comprises at least one of an electrical load or a pneumatic load;
    detecting an operating condition of the APU;
    determining an optimal APU frequency in response to the operating condition and the load; and
    setting an angular velocity of the APU to the optimal APU frequency.

14. The method of claim 13, wherein the operating condition comprises an exhaust gas temperature (EGT).

15. The method of claim 14, wherein the setting the angular velocity of the APU occurs in response to an EGT crossing a threshold value.

16. The method of claim 13, wherein the operating condition comprises at least one of an ambient temperature, an altitude, or an air speed.

17. The method of claim 13, wherein the determining the optimal APU frequency further comprises retrieving the optimal APU frequency from a lookup table.

* * * * *